(12) United States Patent
Zhang et al.

(10) Patent No.: US 10,224,734 B2
(45) Date of Patent: *Mar. 5, 2019

(54) CHARGING SYSTEM

(71) Applicant: GUANGDONG OPPO MOBILE TELECOMMUNICATIONS CORP., LTD., Dongguan (CN)

(72) Inventors: Jialiang Zhang, Dongguan (CN); Fengshuo Liu, Dongguan (CN); Biao Chen, Dongguan (CN); Kewei Wu, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 159 days.

This patent is subject to a terminal disclaimer.

(21) Appl. No.: 15/114,870

(22) PCT Filed: May 14, 2014

(86) PCT No.: PCT/CN2014/077432
§ 371 (c)(1),
(2) Date: Jul. 28, 2016

(87) PCT Pub. No.: WO2015/113343
PCT Pub. Date: Aug. 6, 2015

(65) Prior Publication Data
US 2017/0005500 A1    Jan. 5, 2017

(30) Foreign Application Priority Data
Jan. 28, 2014  (CN) .......................... 2014 1 0043182

(51) Int. Cl.
*H02J 7/00* (2006.01)
*H02J 7/02* (2016.01)
*H02J 7/08* (2006.01)

(52) U.S. Cl.
CPC .............. *H02J 7/0081* (2013.01); *H02J 7/00* (2013.01); *H02J 7/0021* (2013.01);
(Continued)

(58) Field of Classification Search
CPC .... H02J 7/00; H02J 7/027; H02J 7/085; H02J 7/0021; H02J 7/0045; H02J 7/0052; H02J 7/0081
(Continued)

(56) References Cited

U.S. PATENT DOCUMENTS 9,348,382 B2     5/2016   Helfrich et al.
2002/0130638 A1*  9/2002  Sherman ................... G06F 1/26
                                                              320/134
(Continued)

FOREIGN PATENT DOCUMENTS

CN          1747253        3/2006
CN          1848587       10/2006
(Continued)

OTHER PUBLICATIONS

EPO, Office Action for EP Application No. 14880839 dated Oct. 6, 2017.
(Continued)

*Primary Examiner* — Zixuan Zhou
(74) *Attorney, Agent, or Firm* — Hodgson Russ LLP

(57) ABSTRACT

The present invention provides a charging system that includes a charging adapter and a mobile terminal. The charging adapter includes: a second USB interface; and an adjusting circuit for rectifying and filtering the mains supply to obtain an original power signal, for performing a voltage adjustment on the original power signal, and for outputting a power signal after the voltage adjustment. The mobile terminal includes a first USB interface. P first power wires in the first USB interface and P second power wires in the
(Continued)

second USB interface are correspondingly coupled, and Q first ground wires in the first USB interface and Q second ground wires in the second USB interface are correspondingly coupled. Because each first power wire and a corresponding second power wire are coupled, at least two charging circuits can be provided, and the charging system supports charging with a large current more than 3 A.

20 Claims, 2 Drawing Sheets

(52) U.S. Cl.
CPC .......... *H02J 7/0045* (2013.01); *H02J 7/0052* (2013.01); *H02J 7/027* (2013.01); *H02J 7/085* (2013.01); *H02J 2007/0062* (2013.01); *H02J 2007/0096* (2013.01)

(58) Field of Classification Search
USPC .......................... 320/107, 114; 455/572, 573
See application file for complete search history.

(56) References Cited

U.S. PATENT DOCUMENTS

| | | | |
|---|---|---|---|
| 2006/0284595 | A1 | 12/2006 | Hsieh et al. |
| 2007/0024239 | A1* | 2/2007 | Park .................. G06F 1/263 320/114 |
| 2008/0265838 | A1* | 10/2008 | Garg .................. G06F 1/266 320/115 |
| 2010/0233908 | A1* | 9/2010 | Tseng .................. H01R 27/00 439/620.21 |
| 2012/0246350 | A1* | 9/2012 | Lee .................. H02J 7/0008 710/16 |
| 2012/0300516 | A1 | 11/2012 | Chen et al. |

FOREIGN PATENT DOCUMENTS

| | | |
|---|---|---|
| CN | 102403742 | 4/2012 |
| CN | 103444258 | 12/2013 |
| CN | 103746434 | 4/2014 |
| CN | 103762690 | 4/2014 |
| CN | 203761089 | 8/2014 |
| EP | 3101756 A1 | 7/2016 |
| TW | 201214917 | 4/2012 |
| WO | 2008110219 A1 | 9/2008 |
| WO | 2009063278 A1 | 5/2009 |

OTHER PUBLICATIONS

International Searching Authority, International Search Report for PCT/CN2014/077432 dated Oct. 28, 2014.
International Searching Authority, Written Opinion of the International Searching Authority for PCT/CN2014/077432 dated Oct. 28, 2014.
USPTO, Office Action for U.S. Appl. No. 15/823,014, dated Feb. 23, 2018.
EPO, Office Action for EP Application No. 18187356.3, dated Nov. 6, 2018.

* cited by examiner

CHARGING SYSTEM

CROSS-REFERENCE TO RELATED APPLICATIONS

This application is a U.S. national phase application based up an International Application No. PCT/CN2014/077432, filed on May 14, 2014, which is based on and claims priority to Chinese Patent Application No. 201410043182.0, filed on Jan. 28, 2014, the entire contents of which are incorporated herein by reference.

TECHNICAL FIELD

The present disclosure relates to mobile terminal field, and more particularly, to a charging system.

BACKGROUND

With the progress of the times, the internet and mobile communication network provide massive functions and applications. A user not only can use a mobile terminal to perform conventional applications, such as use a smart phone to answer a call or call somebody up, but also can use the mobile terminal to browse a webpage, transmit a picture or play a game and so on.

When the mobile terminal is used to handle matters, a huge quantity of electricity in a cell of the mobile terminal is consumed due to the increased usage frequency of the mobile terminal, such that it is required to charge the mobile terminal frequently. Since the pace of life becomes more and more fast, particularly, emergencies become more and more frequent, the user wants to charge the cell of the mobile terminal with large current.

When a charging adapter is used to charge the mobile terminal in the related art, MICRO USB interfaces (including a MICRO USB plug in the charging adapter and a MICRO USB socket in the mobile terminal) are generally adopted for charging via insertion-connection. Since the MICRO USB interface includes only one power wire and only one ground wire, the charging can be performed through only one charging circuit formed by the only one power wire and the only one ground wire. Therefore, it only supports the charging current not greater than 3 A, so that the charging speed is slow and time is wasted.

SUMMARY

The present disclosure relates to a charging system.

In at least one embodiment of the present disclosure, a charging system is provided. The charging system includes a charging adapter and a mobile terminal.

The charging adapter includes:
a second USB interface, having P second power wires, Q second ground wires and N second data wires, where P is greater than or equal to 2, Q is greater than or equal to 2, and N is greater than or equal to 1; and
an adjusting circuit, having a power terminal, a power signal output terminal and a ground signal output terminal, the power terminal being coupled to an external mains supply, the power signal output terminal being coupled to each of the P second power wires, the ground signal output terminal being coupled to each of the Q second ground wires, and the adjusting circuit being configured to perform a rectifying and a filtering on the mains supply to obtain an original power signal, to perform a voltage adjustment on the original power signal and to output a power signal after the voltage adjustment via the power signal output terminal.

The mobile terminal includes:
a first USB interface, having P first power wires, Q first ground wires and N first data wires, the P first power wires of the first USB interface being insertion-connected with the P second power wires of the second USB interface correspondingly, the Q first ground wires of the first USB interface being insertion-connected with the Q second ground wires of the second USB interface correspondingly, and the N first data wires of the first USB interface being insertion-connected with the N second data wires of the second USB interface correspondingly.

DRAWINGS DESCRIPTION

In order to make the technical solutions of embodiments of the present disclosure more clearly, the accompanying drawings used in the description of embodiments of the present disclosure or of the related art are briefly described hereunder. Obviously, the described drawings are merely some embodiments of present disclosure. For persons skilled in the art, other drawings may be obtained based on these drawings without any creative work.

DETAILED DESCRIPTION

To make the objectives, the technical solutions, and the advantages of embodiments of the present disclosure clearer, the present disclosure is hereinafter further described with reference to the accompanying drawings and embodiments. It should be understood that, the described embodiments are merely used to understand the present disclosure, but shall not be construed to limit the present disclosure. In order to explain the technical solutions of the present disclosure, specific embodiments will be described as follows.

A charging adapter in embodiments of the present disclosure includes a terminal capable of outputting a power signal to charge a cell (a cell of a mobile terminal), such as a power adapter, a charger, an IPAD and a smart phone.

Embodiments of the present disclosure provide a first USB (Universal Serial Bus) interface, which is disposed in a mobile terminal and can be configured for transmitting a power signal. Meanwhile, embodiments of the present disclosure provide a second USB interface, which is disposed in a charging adapter. When the first USB interface is insertion-connected with the second USB interface, each first power wire in the first USB interface is insertion-connected with each second power wire in the second USB interface correspondingly, and thus at least two charging circuits can be provided, thereby realizing charging with large current greater than 3 A.

Figure 1:
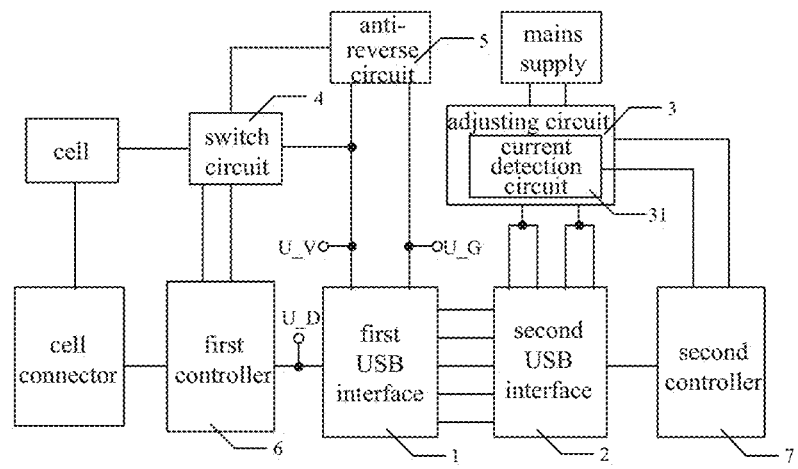
FIG. 1 is a schematic diagram of a charging system provided by an embodiment of the present disclosure.
Figure 2:
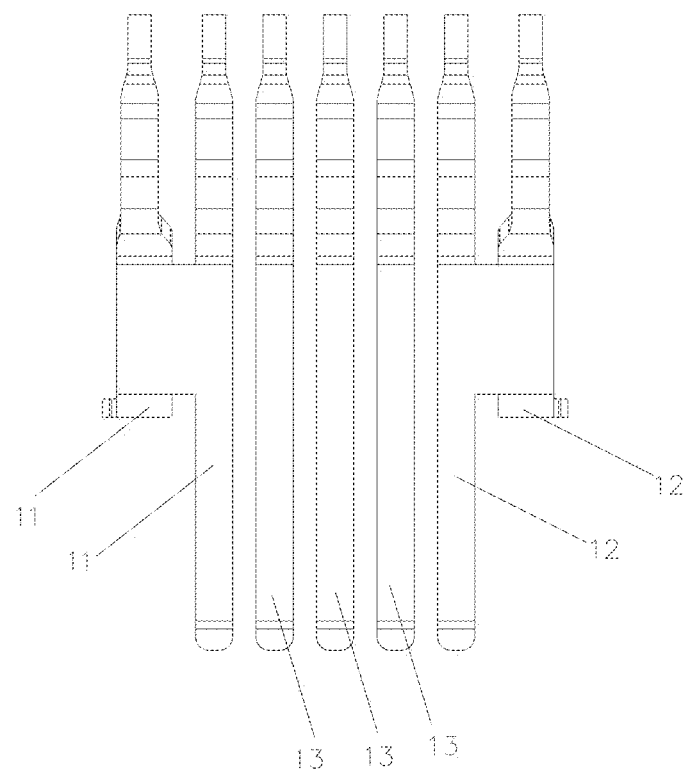
FIG. 2 is a schematic diagram showing an internal structure of a USB interface provided by an embodiment of the present disclosure.

FIG. 1 is a schematic diagram of a charging system provided by an embodiment of the present disclosure, which only shows parts related to the present disclosure. Meanwhile, FIG. 2 shows an internal structure of the first USB interface 1. In at least one embodiment, FIG. 2 is merely used to schematically illustrate the first USB interface 1 provided by embodiments of the present disclosure, and thus only the structure diagram with two power wires, two ground wires and three data wires is shown. In at least one embodiment, the internal structure of the second USB interface 2 in the charging adapter corresponds to the internal structure of the first USB interface 1 in the mobile terminal, for example, each first power wire in the first USB interface 1 is insertion-connected with each second power wire in the second USB interface 2 correspondingly, and each first data wire in the first USB interface 1 is insertion-connected with each second data wire in the second USB interface 2 correspondingly, and thus a schematic diagram of the second USB interface 2 is not shown in embodiments of the present disclosure.

Referring to FIG. 1 in combination with FIG. 2, the charging system provided by embodiments of the present disclosure includes the charging adapter and the mobile terminal.

The charging adapter includes the second USB interface 2. The second USB interface 2 has P second power wires, Q second ground wires and N second data wires, where P is greater than or equal to 2, Q is greater than or equal to 2, and N is greater than or equal to 1.

The charging adapter includes an adjusting circuit 3. The adjusting circuit 3 has a power terminal, a power signal output terminal and a ground signal output terminal. The power terminal is coupled to an external mains supply. The power signal output terminal is coupled to each of the P second power wires. The ground signal output terminal is coupled to each of the Q second ground wires. The adjusting circuit 3 is configured to perform a rectifying and a filtering on the mains supply to obtain an original power signal, to perform a voltage adjustment on the original power signal, and to output a power signal after the voltage adjustment via the power signal output terminal.

The mobile terminal includes the first USB interface 1. The first USB interface 1 has P first power wires, Q first ground wires and N first data wires. The P first power wires of the first USB interface 1 are insertion-connected with the P second power wires of the second USB interface 2 correspondingly. The Q first ground wires of the first USB interface 1 are insertion-connected with the Q second ground wires of the second USB interface 2 correspondingly. The N first data wires of the first USB interface 1 are insertion-connected with the N second data wires of the second USB interface 2 correspondingly.

In the present embodiment, when there is a need to charge the cell of the mobile terminal with the charging adapter, the user will insertion-connect the first USB interface 1 with the second USB interface 2, and thus, the P first power wires of the first USB interface 1 are insertion-connected with the P second power wires of the second USB interface 2 correspondingly, the Q first ground wires of the first USB interface 1 are insertion-connected with the Q second ground wires of the second USB interface 2 correspondingly, and the N first data wires of the first USB interface 1 are insertion-connected with the N second data wires of the second USB interface 2 correspondingly. Therefore, at least two charging circuits (the number of the charging circuits is equal to a minimum of P and Q) can be provided when the cell is charged. The current supported by each charging circuit may be at least equal to the current supported by the existing charging circuit (the one charging circuit provided by existing MICRO USB interfaces), and thus the first USB interface 1 and the second USB interface 2 provided by embodiments of the present disclosure can support larger charging current (equal to or greater than 3 A) compared to the existing USB interfaces (providing only one charging circuit).

Further, the adjusting circuit 3 performs the rectifying and filtering on the mains supply inputted via the power terminal to obtain the original power signal. Then, the voltage of the original power signal is adjusted and the power signal after the voltage adjustment is outputted. The cell of the mobile terminal is charged with the power signal after the voltage adjustment, in which charging current equal to or greater than 3 A can be supported.

In at least one embodiment, when the first USB interface 1 is configured as a USB plug, the second USB interface is configured as a USB socket. In contrast, when the first USB interface 1 is configured as the USB socket, the second USB interface 2 is configured as the USB plug. In this way, it may ensure a good insertion-connection between the first USB interface 1 and the second USB interface 2, including good insertion-connections between the Q first ground wires of the first USB interface 1 and the Q second ground wires of the second USB interface 2, and good insertion-connections between the N first data wires of the first USB interface 1 and N second data wires of the second USB interface 2.

In at least one embodiment, since the first USB interface 1 and the second USB interface 2 can withstand large current (equal to or greater than 3 A), the mobile terminal can drive another mobile terminal (having the second USB interface 2) to work via the first USB interface 1.

In another embodiment of the present disclosure, the mobile terminal further includes a first controller 6.

The first controller 6 has a sample terminal and a first data terminal. The first data terminal is coupled to one or more first data wires of the first USB interface 1. The first controller 6 is configured to receive a voltage value of the cell output by a cell connector via the sample terminal, and to send the voltage value of the cell via the first data terminal.

In at least one embodiment, the cell connector samples the electric quantity of the cell (the voltage value of the cell) of the mobile terminal in real time. Meanwhile, the first controller 6 receives the voltage value of the cell outputted by the cell connector in real time, and sends the voltage value of the cell via the first data terminal, such that the voltage value of the cell is sent to a second controller 7 via the first USB interface 1 and the second USB interface 2.

In another embodiment of the present disclosure, the charging adapter further includes a second controller 7.

The second controller 7 has a control terminal and a third data terminal. The control terminal is coupled to a controlled terminal of the adjusting circuit 3. The third data terminal is coupled to one or more second data wires of the second USB interface 2. The second controller 7 is configured to receive the voltage value of the cell of the mobile terminal via the third data terminal, to compare the voltage value of the cell with a preset voltage value, and to send an adjustment instruction via the control terminal according to a comparison result.

The adjusting circuit 3 is specifically configured to perform the voltage adjustment on the original power signal according to the adjustment instruction received and to output a power signal with a preset current value via the power signal output terminal.

The preset voltage value is set according to actual charging needs. The preset voltage value is set such that, when the voltage of the cell is high enough, the charging current is reduced to the preset current value (a current value less than 3 A) for charging with small current (the charging current less than 3 A).

In the present embodiment, the second controller 7 receives the voltage value of the cell of the mobile terminal 5 via the third data terminal. Then, if the voltage value of the cell is less than the preset voltage value, no adjustment instruction is outputted; if the voltage value of the cell is equal to or greater than the preset voltage value, the adjustment instruction is outputted, and the adjusting circuit 3 reduces the current value of the power signal outputted from the power signal output terminal to the preset current value according to the adjustment instruction.

In another embodiment of the present disclosure, the adjusting circuit 3 further includes a current detection circuit 31.

A detection output terminal of the current detection circuit 31 is coupled to a calibration terminal of the second controller 7. The current detection circuit 31 is configured to detect the current value of the power signal via a detection resistor, and to send the current value detected to the second controller 7.

The second controller 7 is further configured to send a calibration instruction to the adjusting circuit 3 if the current value detected is not equal to the preset current value.

The adjusting circuit 3 is further configured to re-perform the voltage adjustment on the original power signal according to the calibration instruction, and to output a calibrated power signal via the power signal output terminal.

In the present embodiment, after the adjusting circuit 3 reduces the current value of the power signal outputted from the power signal output terminal to the preset current value according to the adjustment instruction, in order to further ensure the current value of the power signal outputted by the adjusting circuit 3 via the power signal output terminal equal to the preset current value, the current detection circuit 3 detects the current value of the power signal outputted from the power signal output terminal in real time via the detection resistor thereof, and then sends the current value detected to the second controller 7 in real time; further, if the current value detected is not equal to the preset current value, the second controller 7 sends the calibration instruction to the adjusting circuit 3, and the adjusting circuit 3 re-adjusts the voltage of the original power signal and outputs the re-adjusted power signal (i.e., the calibrated power signal), such that it ensures that the current value of the re-adjusted power signal is equal to the preset current value.

In another embodiment of the present disclosure, the mobile terminal further includes a switch circuit 4.

The switch circuit 4 has a cell terminal, a charging terminal, a first controlled terminal and a second controlled terminal. The cell terminal is coupled to an anode of the cell. The charging terminal is coupled to the first power wires of the first USB interface 1. The first controlled terminal is coupled to a first control terminal of the first controller 6. The second controlled terminal is coupled to a second control terminal of the first controller 6. The switch circuit 4 is configured to couple the charging terminal with the cell terminal when receiving via the first controlled terminal a coupling instruction sent by the first controller 6, such that the charging adapter charges the cell. The switch circuit 4 is configured to switch off a coupling between the charging terminal and the cell terminal when receiving via the second controlled terminal a first switch-off instruction sent by the first controller 6, such that the charging adapter stops charging the cell.

In at least one embodiment, the cell connector included in the mobile terminal is further configured to generate an anode contact signal when detecting whether the anode of the cell is contacted, to generate a cathode contact signal when detecting whether a cathode of the cell is contacted, to generate an electric quantity signal when detecting an electric quantity of the cell, and to send the anode contact signal, the cathode contact signal and the electric quantity signal to the first controller 6.

Further, the first controller 6 can determine whether a positive charging contact point of the charging circuit of the mobile terminal is well contacted with the anode of the cell according to the anode contact signal, can determine whether a negative charging contact point of the charging circuit of the mobile terminal is well contacted with the cathode of the cell according to the cathode contact signal, and can determine whether the voltage of the cell exceeds a voltage threshold according to the electric quantity signal.

If it is detected that the positive charging contact point is welled contacted with the anode of the cell, the negative charging contact point is well contacted with the cathode of the cell, and the voltage of the cell is less than the voltage threshold, the first controller 6 sends a coupling instruction to the switch circuit 4. Thus, when the switch circuit 4 receives via the first controlled terminal the coupling instruction sent by the first controller 6, the switch circuit 4 couples the charging terminal with the cell terminal, and the charging adapter can charge the cell of the mobile terminal via the switch circuit 4.

If it is detected that the positive charging contact point is not well contacted with the anode of the cell, the negative charging contact point is not well contacted with the cathode of the cell, and the voltage of the cell is higher than the voltage threshold, the first controller 6 sends the first switch-off instruction to the switch circuit 4 in time. Then, when the switch circuit 4 receives via the second controlled terminal the first switch-off instruction sent by the first controller 6, the switch circuit 4 switches off the coupling between the charging terminal and the cell terminal, such that the charging adapter is stopped from charging the cell.

In another embodiment of the present disclosure, the mobile terminal further includes an anti-reverse circuit 5.

The anti-reverse circuit 5 has a high potential terminal, a low potential terminal and a control output terminal. The high potential terminal is coupled to the first power wires of the first USB interface 1. The low potential terminal is coupled to the first ground wires of the first USB interface 1. The control output terminal is coupled to a third controlled terminal of the switch circuit 4. The anti-reverse circuit 5 is configured to send a second switch-off instruction to the switch circuit 4 when a ground signal is coupled to the high potential terminal and a power signal is coupled to the low potential terminal, such that the switch circuit 4 switches off the coupling between the charging terminal and the cell terminal.

In the present embodiment, in order to avoid that the ground signal is coupled to the anode of the cell and the power signal is coupled to the cathode of the cell when the cell is charged, it is detected whether the power signal and the ground signal are reversely coupled (for example, the first USB interface 1 and the second USB interface 2 are reversely coupled, such that the electric signal coupled to the first power wires of the first USB interface 1 is the ground signal, and the electric signal coupled to the first ground wires of the first USB interface 1 is the power signal) at the high potential terminal and the low potential terminal, thereby ensuring that the electric signal coupled to the first power wires of the first USB interface 1 is the power signal and the electric signal coupled to the first ground wires of the first USB interface 1 is the ground signal.

In addition, if the electric signal coupled to the first power wires of the first USB interface 1 is the ground signal, and the electric signal coupled to the first ground wires of the first USB interface 1 is the power signal, the anti-reverse circuit 5 will sends the second switch-off instruction to the switch circuit 4, and then the switch circuit 4 switches off the electric coupling between the charging terminal and the cell terminal in time, so as to stop the charging adapter from charging the cell of the mobile terminal. In this way, an anti-reverse protection can be performed for the cell of the mobile terminal and the internal circuit (including the charging circuit) of the mobile terminal.

Figure 3:
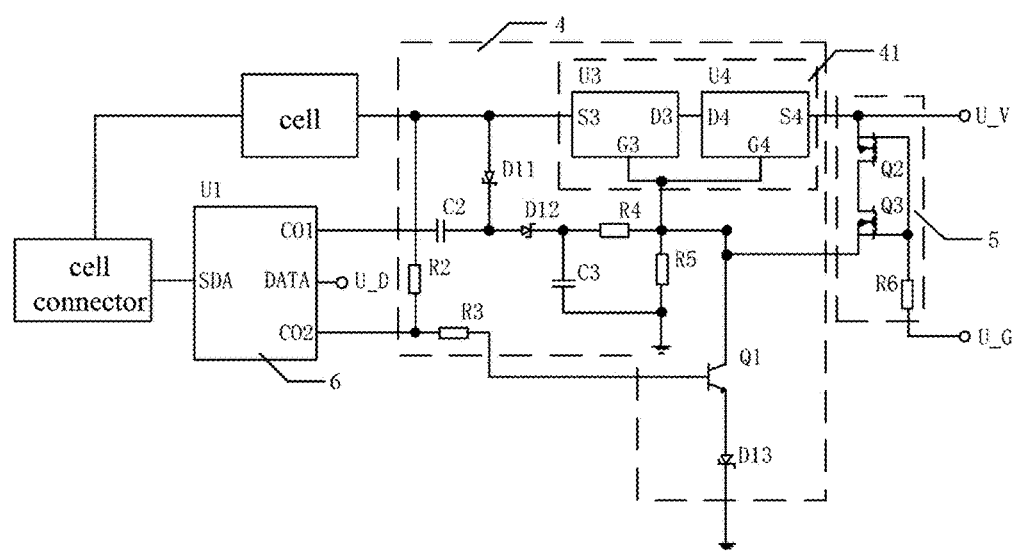
FIG. 3 is a schematic diagram showing a charging circuit in a mobile terminal of a charging system provided by an embodiment of the present disclosure.

FIG. 3 shows a specific diagram of the charging circuit in the mobile terminal of the charging system provided by embodiments of the present disclosure. For illustration, only parts related to embodiments of the present disclosure are described.

In at least one embodiment, the switch circuit 4 includes a second capacitor C2, a third capacitor C3, a second resistor R2, a third resistor R3, a fourth resistor R4, a fifth resistor R5, a first Schottky diode D11, a second Schottky diode D12, a third Schottky diode D13, a NPN triode Q1 and a switch module 41.

A first terminal of the second resistor R2, a second terminal of the switch module 41, a first terminal of the second capacitor C2, and a second terminal of the second resistor R2 are configured as the cell terminal, the charging terminal, the first controlled terminal, and the second controlled terminal of the switch circuit 4, respectively. A first terminal and a second terminal of the third resistor R3 are coupled to the second terminal of the second resistor R2 and a base electrode of the NPN triode Q1, respectively. An anode and a cathode of the third Schottky diode D13 are coupled to an emitter electrode of the NPN triode Q1 and ground, respectively. An anode and a cathode of the first Schottky diode D11 are coupled to the first terminal of the second resistor R2 and a second terminal of the second capacitor C2, respectively. An anode and a cathode of the second Schottky diode D12 are coupled to the second terminal of the second capacitor C2 and a first terminal of the fourth resistor R4, respectively. A first terminal and a second terminal of the third capacitor C3 are coupled to the cathode of the first Schottky diode D11 and ground, respectively. A first terminal and a second terminal of the fifth resistor R5 are coupled to a second terminal of the fourth resistor R4 and ground, respectively. A collector electrode of the NPN triode Q1 is coupled to the second terminal of the fourth resistor R4. A first terminal and a controlled terminal of the switch module 41 are coupled to the first terminal of the second resistor R2 and the second terminal of the fourth resistor R4, respectively.

In practical use, when the coupling instruction (the coupling instruction with high potential) is received via the first controlled terminal, the controlled terminal of the switch module 41 also receives the electric signal with high potential. Further, the second terminal of the switch module 41 is electrically coupled with the first terminal of the switch module 41, thereby forming an electric path from the charging terminal to the cell terminal via the switch module 41. Therefore, the power signal inputted via the first power wires of the first USB interface 1 can charge the cell of the mobile terminal via the switch circuit 4.

When the first switch-off instruction with high potential is received via the second controlled terminal, the NPN triode Q1 is switched on, and then the controlled terminal of the switch module 41 receives the electric signal with low potential, which switches off the electric coupling between the second terminal and the first terminal of the switch module 41, thereby switching off the electric path from the charging terminal to the cell terminal, and stopping charging the cell of the mobile terminal via the switch circuit 4.

In at least one embodiment, the switch module 41 includes a third switch chip U3 and a fourth switch chip U4. A source pin S3 of the third switch chip U3, a source pin S4 of the fourth switch chip U4, and a gate pin G4 of the fourth switch chip U4 are configured as the second terminal, the first terminal and the controlled terminal of the switch module 41, respectively. A gate pin G3 and a drain pin D3 of the third switch chip U3 are coupled to the gate pin G4 and a drain pin D4 of the fourth switch chip U4, respectively.

In the present embodiment, when the controlled terminal of the switch module 41 receives the electric signal with high potential, the gate pin G3 of the third switch chip U3 and the gate pin G4 of the fourth switch chip U4 also receive the electric signal with high potential, and thus the source pin S3 of the third switch chip U3 is electrically conducted to the drain pin D3, and the source pin S4 of the fourth switch chip U4 is electrically conducted to the drain pin D4, thereby forming an electric path between the source pin S3 of the third switch chip U3 and the source pin S4 of the fourth switch chip U4, and the first terminal of the switch module 41 being electrically coupled with the second terminal of the switch module 41.

In contrast, when the controlled terminal of the switch module 41 receives the electric signal with low potential, the gate pin G3 of the third switch chip U3 and the gate pin G4 of the fourth switch chip U4 also receive the electric signal with low potential, and thus the source pin S3 of the third switch chip U3 cannot be electrically conducted to the drain pin D3, and the source pin S4 of the fourth switch chip U4 cannot be electrically conducted to the drain pin D4, thereby not forming an electric path between the source pin S3 of the third switch chip U3 and the source pin S4 of the fourth switch chip U4, and the first terminal of the switch module 41 being not electrically coupled with the second terminal of the switch module 41. Thus, the power signal inputted via the high potential charging input terminal cannot charge the cell of the mobile terminal via the switch circuit 4.

In at least one embodiment, the anti-reverse circuit 5 includes a sixth resistor R6, a first NMOS transistor Q2 and a second NMOS transistor Q3.

A source electrode of the first NMOS transistor Q2, a second terminal of the sixth resistor R6, and a source electrode of the second NMOS transistor Q3 are configured as the high potential terminal, the low potential terminal and the control output terminal of the anti-reverse circuit 5, respectively. A grid electrode and a drain electrode of the first NMOS transistor Q2 are coupled to a grid electrode and a drain electrode of the second NMOS transistor Q3, respectively. A first terminal of the sixth resistor R6 is coupled to the grid electrode of the first NMOS transistor Q2.

In at least one embodiment, when the high potential terminal of the anti-reverse circuit 5 is coupled to the ground signal, and the low potential terminal is coupled to the power signal, both the first NMOS transistor Q2 and the second NMOS transistor Q3 are switched on, and then the controlled terminal of the switch module 41 is coupled to the electric signal with low potential, the first terminal and second terminal of the switch module 41 cannot form an electric path, and thus the charging circuit for the power signal inputted via the high potential charging input terminal to charge the cell of the mobile terminal via the switch circuit 4 is switched off.

In another embodiment of the present disclosure, each of the first power wires, the first ground wires, the second power wires and the second ground wires is made of phosphor bronze C7025.

Each of the power wire and the ground wire in the existing MICRO USB interface for charging the cell of the mobile terminal is made of metal copper foil with electric conductively less than 20%. However, all of the first power wires and the first ground wires in the first USB interface 1 of the mobile terminal are made of phosphor bronze C7025 whose electric conductivity can reach 50%. Correspondingly, all of the second power wires and the second ground wires in the second USB interface 2 of the charging adapter are made of phosphor bronze C7025 whose electric conductivity can reach 50%. Thus, compared to the existing MICRO USB interfaces, the first USB interface 1 and the second USB interface 2 provided by embodiments of the present disclosure can withstand greater charging current.

In another embodiment, each of the first power wires, the first ground wires, the second power wires and the second ground wires is made of chromium bronze C18400.

In at least one embodiment, all of the first power wires and the first ground wires in the first USB interface 1 of the mobile terminal are made of chromium bronze C18400 whose electric conductivity can reach 70%. Correspondingly, all of the second power wires and the second ground wires in the second USB interface 2 of the charging adapter are made of chromium bronze C18400 whose electric conductivity can reach 70%. Thus, compared to the existing MICRO USB interfaces, the first USB interface 1 and the second USB interface 2 provided by embodiments of the present disclosure can withstand greater charging current.

In this way, compared to the existing MICRO USB interfaces, the first USB interface 1 and the second USB interface 2 provided by embodiments of the present disclosure can withstand greater charging current. Therefore, after the first USB interface 1 is insertion-connected with the second USB interface 2, the charging adapter can charge the cell of the mobile terminal with large current (charging current equal to or greater than 3 A) via the insertion-connected first USB interface 1 and second USB interface 2.

The embodiments described hereinabove are only preferred embodiments of the present application, and should not be interpreted as limitation to the present application. For the persons skilled in the art, various variations and modifications may be made to the present application. Any modifications, equivalent replacements and improvements made within the spirit and principle of the present application are also deemed to fall into the protection scope of the present application.

What is claimed is:

1. A charging system, comprising a charging adapter and a mobile terminal, wherein,
   the charging adapter comprises:
   a second Universal Serial Bus (USB) interface, having P second power wires, Q second ground wires and N second data wires, wherein P is greater than or equal to 2, Q is greater than or equal to 2, and N is greater than or equal to 1;
   an adjusting circuit, having a power terminal, a power signal output terminal and a ground signal output terminal, the power terminal being coupled to an external mains supply, the power signal output terminal being coupled to each of the P second power wires, the ground signal output terminal being coupled to each of the Q second ground wires, and the adjusting circuit being configured to perform a rectifying and a filtering on the mains supply to obtain an original power signal, to perform a voltage adjustment on the original power signal and to output a power signal after the voltage adjustment via the power signal output terminal; and
   a controller having a control terminal and a data terminal, the mobile terminal comprises:
   a first USB interface, having P first power wires, Q first ground wires and N first data wires, the P first power wires of the first USB interface being insertion-connected with the P second power wires of the second USB interface correspondingly, the Q first ground wires of the first USB interface being insertion-connected with the Q second ground wires of the second USB interface correspondingly, and the N first data wires of the first USB interface being insertion-connected with the N second data wires of the second USB interface correspondingly.

2. The charging system according to claim 1, wherein, the mobile terminal further comprises:
   a first controller, having a sample terminal and a first data terminal, the first data terminal being coupled to one or more first data wires of the first USB interface, and the first controller being configured to receive a voltage value of a cell output by a cell connector via the sample terminal and to send the voltage value of the cell via the first data terminal.

3. The charging system according to claim 2, wherein,
   the controller of the charging adapter is a second controller and the data terminal is a third data terminal, the control terminal being coupled to a controlled terminal of the adjusting circuit, the third data terminal being coupled to one or more second data wires of the second USB interface, and the second controller being configured to receive the voltage value of the cell of the mobile terminal via the third data terminal, to compare the voltage value of the cell with a preset voltage value, and to send an adjustment instruction via the control terminal according to a comparison result;
   the adjusting circuit is configured to perform the voltage adjustment on the original power signal according to the adjustment instruction received and to output a power signal with a preset current value via the power signal output terminal.

4. The charging system according to claim 3, wherein,
   the adjusting circuit further comprises a current detection circuit, a detection output terminal of the current detection circuit being coupled to a calibration terminal of the second controller, and the current detection circuit being configured to detect a current value of the power signal via a detection resistor, and to send the current value detected to the second controller;
   the second controller is further configured to send a calibration instruction to the adjusting circuit according to a difference between the current value detected and the present current value;
   the adjusting circuit is further configured to re-perform the voltage adjustment on the original power signal according to the calibration instruction, and to output a calibrated power signal via the power signal output terminal.

5. The charging system according to claim 2, wherein, the mobile terminal further comprises:

a switch circuit, having a cell terminal, a charging terminal, a first controlled terminal and a second controlled terminal, the cell terminal being coupled to an anode of the cell, the charging terminal being coupled to the first power wires of the first USB interface, the first controlled terminal being coupled to a first control terminal of the first controller, the second controlled terminal being coupled to a second control terminal of the first controller, and the switch circuit being configured to couple the charging terminal with the cell terminal when receiving via the first controlled terminal a coupling instruction sent by the first controller, such that the charging adapter charges the cell; and to switch off a coupling between the charging terminal and the cell terminal when receiving via the second controlled terminal a first switch-off instruction sent by the first controller, such that the charging adapter stops charging the cell.

6. The charging system according to claim 5, wherein, the mobile terminal further comprises:
an anti-reverse circuit, having a high potential terminal, a low potential terminal and a control output terminal, the high potential terminal being coupled to the first power wires of the first USB interface, the low potential terminal being coupled to the first ground wires of the first USB interface, the control output terminal being coupled to a third controlled terminal of the switch circuit, and the anti-reverse circuit being configured to send a second switch-off instruction to the switch circuit when a ground signal is coupled to the high potential terminal and a power signal is coupled to the low potential terminal, such that the switch circuit switches off the coupling between the charging terminal and the cell terminal.

7. The charging system according to claim 5, wherein, the switch circuit comprises a second capacitor, a third capacitor, a second resistor, a third resistor, a fourth resistor, a fifth resistor, a first Schottky diode, a second Schottky diode, a third Schottky diode, a NPN triode and a switch module;
a first terminal of the second resistor, a second terminal of the switch module, a first terminal of the second capacitor and a second terminal of the second resistor are configured as the cell terminal, the charging terminal, the first controlled terminal and the second controlled terminal of the switch circuit respectively, a first terminal and a second terminal of the third resistor are coupled to the second terminal of the second resistor and a base electrode of the NPN triode respectively, an anode and a cathode of the third Schottky diode are coupled to an emitter electrode of the NPN triode and ground respectively, an anode and a cathode of the first Schottky diode are coupled to the first terminal of the second resistor and a second terminal of the second capacitor respectively, an anode and a second cathode of the second Schottky diode are coupled to the second terminal of the second capacitor and a first terminal of the fourth resistor respectively, a first terminal and a second terminal of the third capacitor are coupled to the cathode of the first Schottky diode and ground respectively, a first terminal and a second terminal of the fifth resistor are coupled to a second terminal of the fourth resistor and ground respectively, a collector electrode of the NPN triode is coupled to the second terminal of the fourth resistor, and a first terminal and a controlled terminal of the switch module are coupled to the first terminal of the second resistor and the second terminal of the fourth resistor respectively.

8. The charging system according to claim 7, wherein, the switch module comprises a third switch chip and a fourth switch chip;
a source pin of the third switch chip, a source pin of the fourth switch chip, and a gate pin of the fourth switch chip are configured as the second terminal, the first terminal and the controlled terminal of the switch module respectively, and a gate pin and a drain pin of the third switch chip are coupled to the gate pin and a drain pin of the fourth switch chip respectively.

9. The charging system according to claim 7, wherein, the anti-reverse circuit comprises a sixth resistor, a first NMOS transistor and a second NMOS transistor;
a source electrode of the first NMOS transistor, a second terminal of the sixth resistor, and a source electrode of the second NMOS transistor are configured as the high potential terminal, the low potential terminal and the control output terminal of the anti-reverse circuit respectively, a grid electrode and a drain electrode of the first NMOS transistor are coupled to a grid electrode and a drain electrode of the second NMOS transistor respectively, and a first terminal of the sixth resistor is coupled to the grid electrode of the first NMOS transistor.

10. The charging system according to claim 1, wherein, each of the first power wires, the first ground wires, the second power wires and the second ground wires is made of phosphor bronze C7025 or chromium bronze C18400.

11. The charging system according to claim 3, wherein the second controller is further configured to not send the adjustment instruction if the voltage value of the cell is less than the preset voltage value, and to sending the adjustment instruction if the voltage value of the cell is greater than or equal to the preset voltage value.

12. The charging system according to claim 11, wherein the adjusting circuit is further configured to reduce an output current of the original power signal to the preset current value if the adjustment instruction is received.

13. The charging system according to claim 5, wherein the mobile terminal further comprises:
a cell connector configured to generate an anode contact signal when detecting whether an anode of the cell is contacted, to generate a cathode contact signal when detecting whether a cathode of the cell is contacted, to generate an electric quantity signal when detecting an electric quantity of the cell, and to send the anode contact signal, the cathode contact signal and the electric quantity signal to the first controller.

14. The charging system according to claim 13, wherein the first controller is further configured to:
determine whether a positive charging contact point of a charging circuit of the mobile terminal is well contacted with the anode of the cell according to the anode contact signal, to determine whether a negative charging contact point of the charging circuit of the mobile terminal is well contacted with the cathode of the cell according to the cathode contact signal, and to determine whether the voltage value of the cell exceeds the preset voltage value according to the electric quantity signal.

15. The charging system according to claim 14, wherein the first controller is further configured to:
send a coupling instruction to the switch circuit if it is detected that the positive charging contact point is welled contacted with the anode of the cell, the negative charging contact point is well contacted with the cathode of the cell, and the voltage value of the cell is less than the preset voltage value.

16. The charging system according to claim 15, wherein the switch circuit is further configured to:
receive the coupling instruction via the first controlled terminal and to couple the charging terminal with the cell terminal, such that the charging adapter charges the cell of the mobile terminal via the switch circuit.

17. The charging system according to claim 14, wherein the first controller is further configured to:
send the first switch-off instruction to the switch circuit if it is detected that the positive charging contact point is not well contacted with the anode of the cell, the negative charging contact point is not well contacted with the cathode of the cell, and the voltage value of the cell is higher than or equal to the preset voltage value.

18. The charging system according to claim 17, wherein the switch circuit is further configured to:
receive the first switch-off instruction via the second controlled terminal, and to switch off a coupling between the charging terminal and the cell terminal, such that the charging adapter is stopped from charging the cell.

19. The charging system according to claim 3, wherein, the mobile terminal further comprises:
a switch circuit, having a cell terminal, a charging terminal, a first controlled terminal and a second controlled terminal, the cell terminal being coupled to an anode of the cell, the charging terminal being coupled to the first power wires of the first USB interface, the first controlled terminal being coupled to a first control terminal of the first controller, the second controlled terminal being coupled to a second control terminal of the first controller, and the switch circuit being configured to couple the charging terminal with the cell terminal when receiving via the first controlled terminal a coupling instruction sent by the first controller, such that the charging adapter charges the cell; and to switch off a coupling between the charging terminal and the cell terminal when receiving via the second controlled terminal a first switch-off instruction sent by the first controller, such that the charging adapter stops charging the cell.

20. The charging system according to claim 4, wherein, the mobile terminal further comprises:
a switch circuit, having a cell terminal, a charging terminal, a first controlled terminal and a second controlled terminal, the cell terminal being coupled to an anode of the cell, the charging terminal being coupled to the first power wires of the first USB interface, the first controlled terminal being coupled to a first control terminal of the first controller, the second controlled terminal being coupled to a second control terminal of the first controller, and the switch circuit being configured to couple the charging terminal with the cell terminal when receiving via the first controlled terminal a coupling instruction sent by the first controller, such that the charging adapter charges the cell; and to switch off a coupling between the charging terminal and the cell terminal when receiving via the second controlled terminal a first switch-off instruction sent by the first controller, such that the charging adapter stops charging the cell.

* * * * *